US011927971B2

(12) United States Patent
Sakurada et al.

(10) Patent No.: US 11,927,971 B2
(45) Date of Patent: Mar. 12, 2024

(54) CONTROL APPARATUS, UNINHABITED AIRBORNE VEHICLE, AND METHOD

(71) Applicant: Toyota Jidosha Kabushiki Kaisha, Toyota (JP)

(72) Inventors: Shin Sakurada, Toyota (JP); Kazuya Nishimura, Anjo (JP); Soutaro Kaneko, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 298 days.

(21) Appl. No.: 17/407,469

(22) Filed: Aug. 20, 2021

(65) Prior Publication Data
US 2022/0113743 A1    Apr. 14, 2022

(30) Foreign Application Priority Data
Oct. 9, 2020  (JP) ................ 2020-171398

(51) Int. Cl.
*G05D 1/10*  (2006.01)
*B64C 39/02*  (2023.01)
*G05D 1/00*  (2006.01)

(52) U.S. Cl.
CPC ........... *G05D 1/101* (2013.01); *B64C 39/024* (2013.01); *B64U 2201/10* (2023.01)

(58) Field of Classification Search
CPC .. G05D 1/101; B64C 39/024; B64U 2201/10; B64U 2101/30
See application file for complete search history.

(56) References Cited

U.S. PATENT DOCUMENTS

| | | | |
|---|---|---|---|
| 11,460,849 B2* | 10/2022 | Deyle | G01C 21/206 |
| 2016/0212598 A1* | 7/2016 | Wang | H04W 4/12 |
| 2018/0322794 A1* | 11/2018 | Beaurepaire | G08G 5/0069 |
| 2019/0189016 A1* | 6/2019 | Kubie | G05D 1/104 |
| 2019/0297412 A1* | 9/2019 | Hentunen | H04K 3/825 |
| 2020/0364998 A1* | 11/2020 | Williams | A61P 13/12 |
| 2020/0366986 A1* | 11/2020 | Ono | G10L 21/0208 |
| 2021/0012669 A1* | 1/2021 | Beaurepaire | G08G 5/0034 |
| 2021/0142776 A1* | 5/2021 | Sadhwani | G05D 1/0094 |
| 2021/0383822 A1* | 12/2021 | Roberts | G01C 21/383 |

FOREIGN PATENT DOCUMENTS

| | | |
|---|---|---|
| JP | 2018-112029 A | 7/2018 |
| JP | 2021-021616 A | 2/2021 |

* cited by examiner

*Primary Examiner* — Anne Marie Antonucci
*Assistant Examiner* — Connor L Knight
(74) *Attorney, Agent, or Firm* — Dinsmore & Shohl LLP

(57) ABSTRACT

A control apparatus is equipped with a control unit. The control unit acquires information on a sound in at least one room arranged along an outer wall of a building. The control unit moves an uninhabited airborne vehicle along the outer wall of the building, based on the information on the sound.

20 Claims, 4 Drawing Sheets

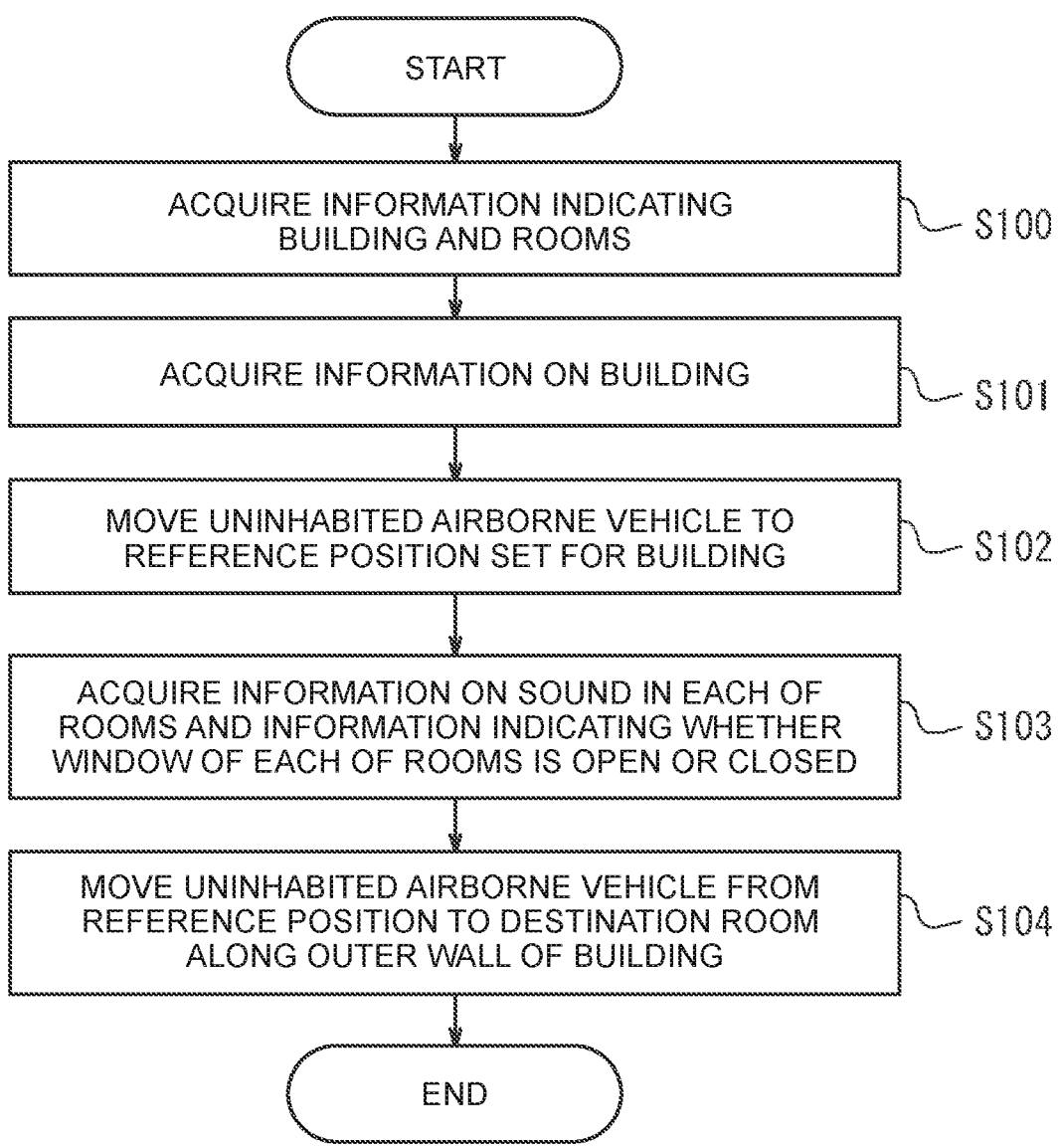

CONTROL APPARATUS, UNINHABITED AIRBORNE VEHICLE, AND METHOD

CROSS-REFERENCE TO RELATED APPLICATION

This application claims priority to Japanese Patent Application No. 2020-171398 filed on Oct. 9, 2020, incorporated herein by reference in its entirety.

BACKGROUND

1. Technical Field

The disclosure relates to a control apparatus, an uninhabited airborne vehicle, and a method.

2. Description of Related Art

Conventionally, there is known an art of controlling an uninhabited airborne vehicle such as a drone. For example, it is disclosed in Japanese Unexamined Patent Application Publication No. 2018-112029 (JP 2018-112029 A) that a drone port is provided on a balcony of a building to deliver goods through the use of a drone.

SUMMARY

In the case where an uninhabited airborne vehicle flies in the vicinity of a building, people in the building may feel uncomfortable with the noise made by the uninhabited airborne vehicle. Accordingly, there is room for improvement in the art of controlling the uninhabited airborne vehicle.

The present disclosure that has been made in view of the foregoing circumstances aims at improving the art of controlling the uninhabited airborne vehicle.

A control apparatus according to one aspect of the present disclosure is a control apparatus that is equipped with a control unit. The control unit acquires information on a sound in at least one room arranged along an outer wall of a building, and moves an uninhabited airborne vehicle along the outer wall of the building, based on the information on the sound.

An uninhabited airborne vehicle according to another aspect of the present disclosure is an uninhabited airborne vehicle that is equipped with a control unit. The control unit controls, based on information on a sound in at least one room arranged along an outer wall of a building, operation of the uninhabited airborne vehicle such that the uninhabited airborne vehicle moves along the outer wall of the building.

A method according to still another aspect of the present disclosure is a method that is carried out by a control apparatus. The methods includes acquiring information on a sound in at least one room arranged along an outer wall of a building, and moving an uninhabited airborne vehicle along the outer wall of the building, based on the information on the sound.

Each of the aspects of the present disclosure improves the art of controlling the uninhabited airborne vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a flowchart showing the operation of the control apparatus.

DETAILED DESCRIPTION OF EMBODIMENTS

One of the embodiments of the disclosure will be described hereinafter.

Outline of Embodiment

Figure 1:
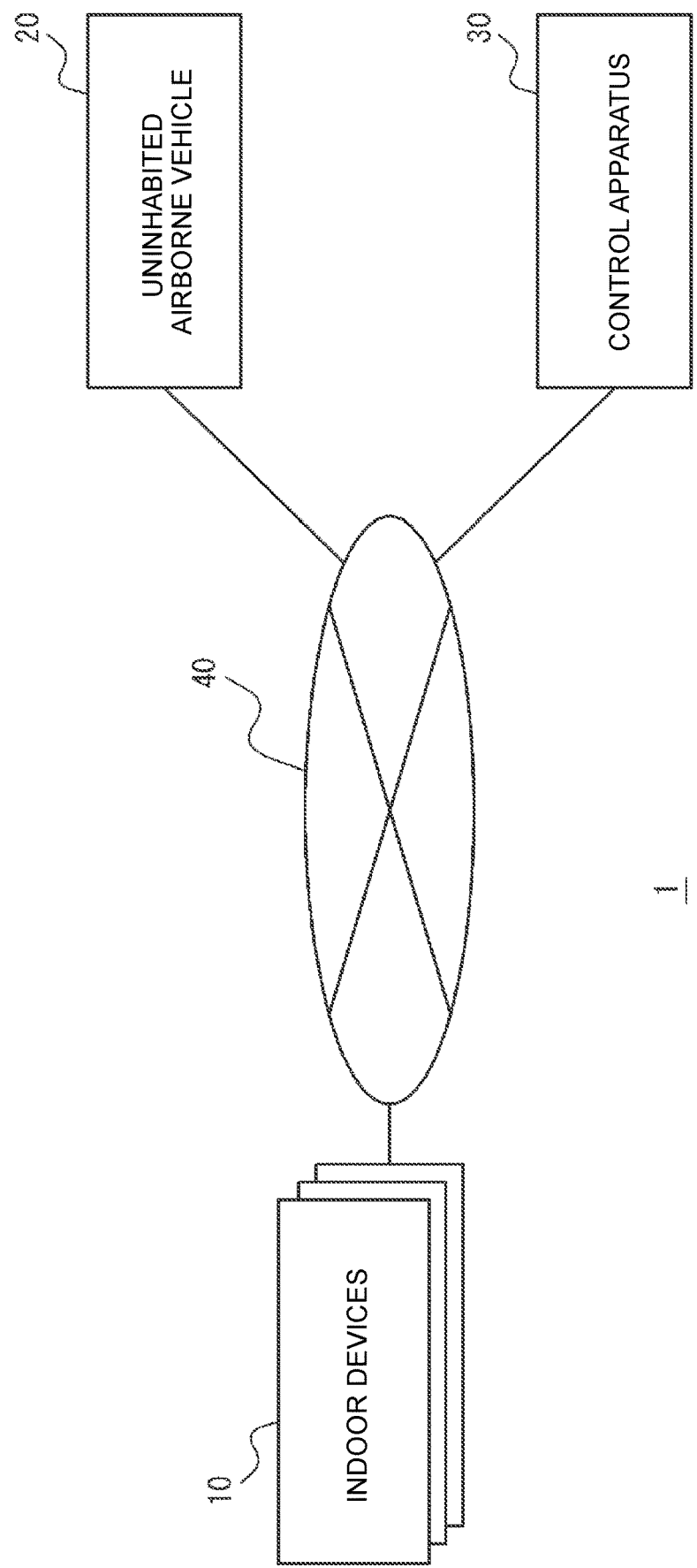
FIG. 1 is a block diagram showing the general configuration of a system according to one of the embodiments of the present disclosure.

The outline of a system 1 according to the embodiment of the present disclosure will be described with reference to FIG. 1. The system 1 is equipped with a plurality of indoor devices 10, an uninhabited airborne vehicle 20, and a control apparatus 30.

The indoor devices 10 are provided in, for example, each of rooms of a building such as a communal building. In the present embodiment, the indoor devices 10 output information on a sound in each of the rooms or information indicating whether a window of each of the rooms is open or closed, with or without wires. For example, the indoor devices 10 that output information on the sounds in the rooms are sound source devices such as television sets, computers, smartphones, speakers, or headphones, or microphones that pick up the sounds in the rooms, but are not limited thereto. Besides, for example, the indoor devices 10 that output information indicating whether the windows of the rooms are open or closed are sensors for detecting whether the windows of the rooms are open or closed, or cameras capable of photographing the windows, but are not limited thereto. Alternatively, the indoor devices 10 may be pieces of networking equipment such as access points that can communicate with the aforementioned sound source devices, the aforementioned microphones, the aforementioned sensors, or the aforementioned cameras.

The control apparatus 30 is, for example, an information processing device such as a computer. The control apparatus 30 can communicate with the indoor devices 10 and the uninhabited airborne vehicle 20 via a network 40 including, for example, the Internet and a mobile telecommunications network. In the present embodiment, the uninhabited airborne vehicle 20 and the control apparatus 30 are managed by a logistics service provider.

The uninhabited airborne vehicle 20 is any aircraft in which nobody is on board. For example, an aircraft such as a drone or a multi-copter can be adopted as the uninhabited airborne vehicle 20. The uninhabited airborne vehicle 20 is mounted with a camera or the like as will be described later. The uninhabited airborne vehicle 20 can fly either autonomously or in cooperation with the control apparatus 30. For example, the uninhabited airborne vehicle 20 can move along a flight path acquired from the control apparatus 30. Besides, upon detecting an obstacle through the use of the camera, the uninhabited airborne vehicle 20 may be able to autonomously bypass the obstacle.

In the present embodiment, the uninhabited airborne vehicle 20 is utilized for a logistics service for transporting goods. The uninhabited airborne vehicle 20 receives goods from senders and gives goods to recipients. As shown in, for example, FIG. 2, upon arriving close to a building 50 such as a communal building, the uninhabited airborne vehicle 20 moves to a balcony C2 of a destination room C that is one of a plurality of rooms A to F, along an outer wall of the building 50, and receives or gives goods on the balcony C2. The receiving and giving of the goods may be pickup or delivery.

It should be noted herein that the uninhabited airborne vehicle 20 can move along the outer wall of the building 50, by keeping a certain distance from an outer wall surface of the building 50. The certain distance is, for example, one meter, but is not limited thereto. If the distance between the moving uninhabited airborne vehicle 20 and the outer wall surface of the building 50 is relatively long, the interiors of the rooms A to F may be captured by the camera of the uninhabited airborne vehicle 20 via windows A1 to F1 provided on the outer wall surface. On the contrary, due to the movement of the uninhabited airborne vehicle 20 along the outer wall of the building 50, the possibility of the interiors of the rooms A to F being captured by the camera of the uninhabited airborne vehicle 20 is reduced, so the privacy of inhabitants can be protected.

On the other hand, when the uninhabited airborne vehicle 20 moves along the outer wall of the building 50, the distance between the uninhabited airborne vehicle 20 and the outer wall surface of the building 50 is relatively short. Therefore, the inhabitants of the building 50 may feel uncomfortable with the noise of the uninhabited airborne vehicle 20. In contrast, according to the present embodiment, the possibility of the inhabitants of the building 50 feeling uncomfortable with the noise of the uninhabited airborne vehicle 20 is reduced as will be described later.

First of all, the outline of the present embodiment will be described, and the details thereof will be described later. In the present embodiment, the control apparatus 30 acquires information on sounds in the rooms A to F arranged along the outer wall of the building 50, from the indoor devices 10 via, for example, the network 40. Then, the control apparatus 30 moves the uninhabited airborne vehicle 20 along the outer wall of the building 50, based on the information on the sounds.

In this manner, according to the present embodiment, the information on the sounds in the rooms A to F of the building 50 is used in moving the uninhabited airborne vehicle 20 along the outer wall of the building 50. Therefore, the uninhabited airborne vehicle 20 can be moved in such a manner as to avoid at least one room where the inhabitants are likely to feel uncomfortable with the noise of the uninhabited airborne vehicle 20, for example, a room where the volume of the sound is relatively low. Accordingly, the art of controlling the uninhabited airborne vehicle 20 is improved in that the possibility of the inhabitants of the building 50 feeling uncomfortable with the noise of the uninhabited airborne vehicle 20 can be reduced.

Figure 2:
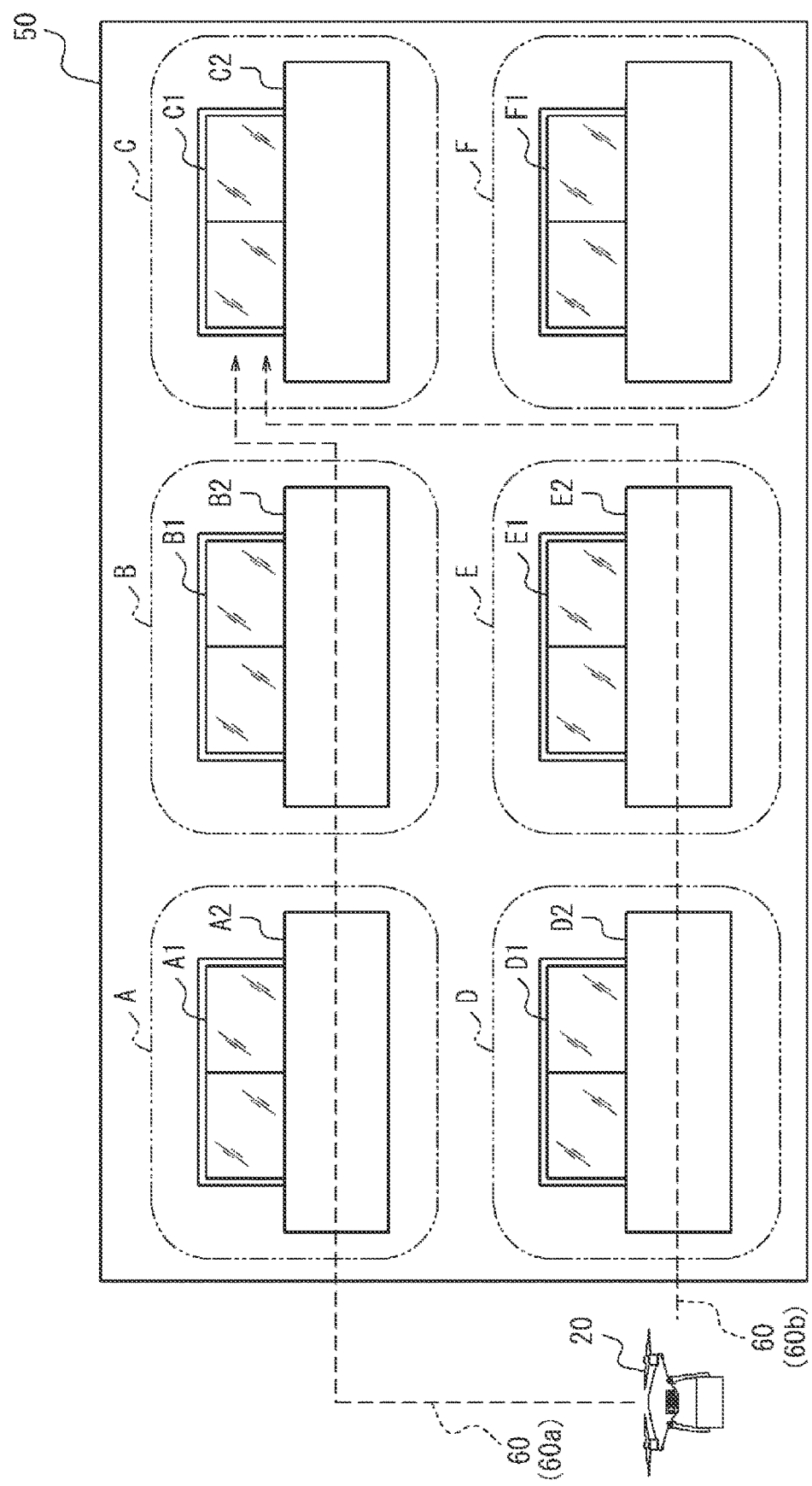
FIG. 2 is a view showing an example of a flight path of an uninhabited airborne vehicle.

For example in FIG. 2, when the volumes of the sounds in the rooms D and E are relatively low, the uninhabited airborne vehicle 20 can move to the destination room C along a flight path 60 (60a). In concrete terms, the uninhabited airborne vehicle 20 moves to the room C after passing in front of balconies A2 and B2 of the rooms A and B, in such a manner as to avoid the rooms D and E. In this case, the possibility of the inhabitants in the relatively quiet rooms D and E feeling uncomfortable with the noise of the uninhabited airborne vehicle 20 is reduced. On the other hand, when the volumes of the sounds in the rooms A and B are relatively low, the uninhabited airborne vehicle 20 can move to the destination room C along a flight path 60 (60b). In concrete terms, the uninhabited airborne vehicle 20 moves to the room C after passing in front of balconies D2 and E2 of the rooms D and E, in such a manner as to avoid the rooms A and B. In this case, the possibility of the inhabitants in the relatively quiet rooms A and B feeling uncomfortable with the noise of the uninhabited airborne vehicle 20 is reduced.

Next, respective components of the system 1 will be described in detail.

(Configuration of Uninhabited Airborne Vehicle)

Figure 3:
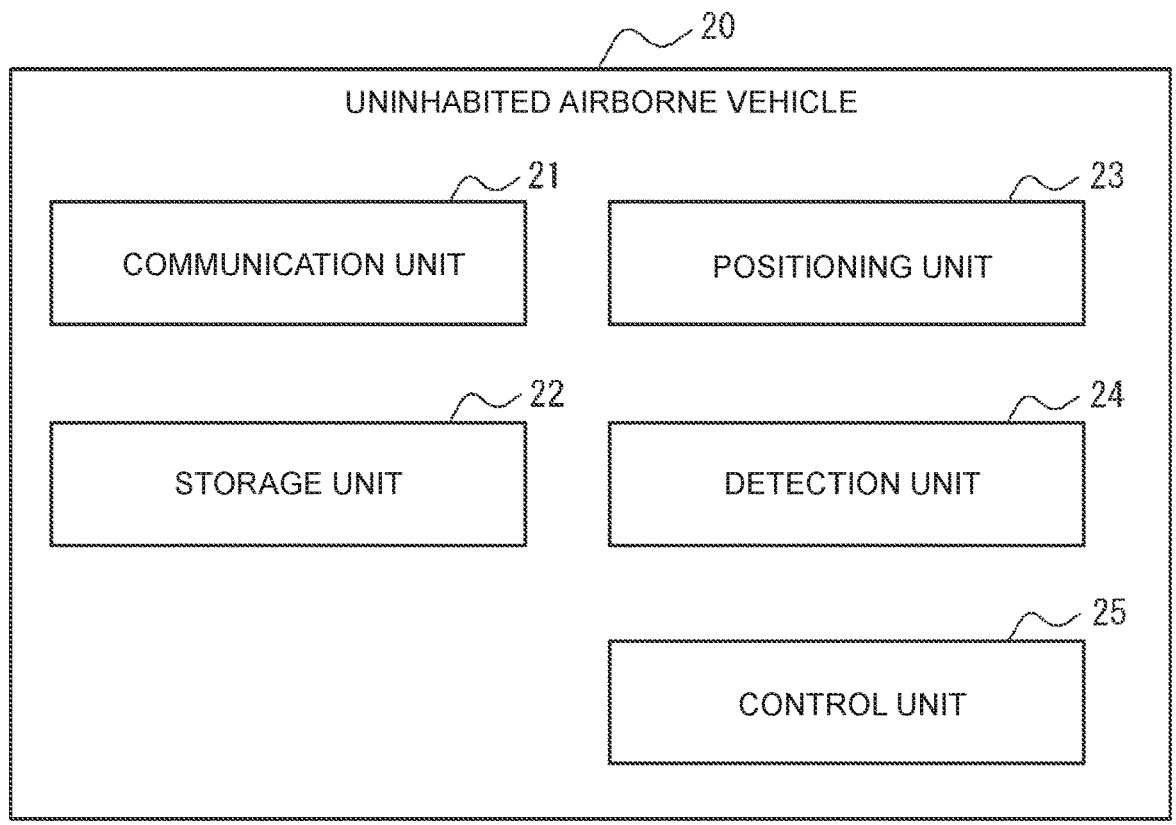
FIG. 3 is a block diagram showing the general configuration of the uninhabited airborne vehicle.

As shown in FIG. 3, the uninhabited airborne vehicle 20 is equipped with a communication unit 21, a storage unit 22, a positioning unit 23, a detection unit 24, and a control unit 25.

The communication unit 21 includes at least one communication interface that is connected to the network 40. The communication interface corresponds to a mobile telecommunications standard, for example, 4th Generation (4G) or 5th Generation (5G), but is not limited thereto. The communication interface may correspond to any communication standard. In the present embodiment, the uninhabited airborne vehicle 20 communicates with the control apparatus 30 via the communication unit 21.

The storage unit 22 includes at least one memory. The memory is, for example, a semiconductor memory, a magnetic memory, or an optical memory, but is not limited thereto. Each memory included in the storage unit 22 may function as, for example, a main storage device, an auxiliary storage device, or a cash memory. The storage unit 22 stores any piece of information used to operate the uninhabited airborne vehicle 20. For example, the storage unit 22 may store a system program, an application program, a piece of embedded software, and the like. The information stored in the storage unit 22 may be updatable with, for example, the information acquired from the network 40 via the communication unit 21.

The positioning unit 23 includes a receiver corresponding to a satellite positioning system. The receiver corresponds to, for example, a global positioning system (GPS), but is not limited thereto. The receiver may correspond to any satellite positioning system. Besides, the positioning unit 23 includes, for example, a gyro sensor, a geomagnetic sensor, and an atmospheric pressure sensor. In the present embodiment, the uninhabited airborne vehicle 20 can acquire positional information on the uninhabited airborne vehicle 20, an orientation in which the uninhabited airborne vehicle 20 is directed, and a tilt of the uninhabited airborne vehicle 20 through the use of the positioning unit 23. The positional information may include two-dimensional coordinate data including a latitude and a longitude, or may include three-dimensional coordinate data including an altitude as well as the latitude and the longitude.

The detection unit 24 includes at least one sensor used to detect an obstacle around the uninhabited airborne vehicle 20. In the present embodiment, the sensor includes a camera, but is not limited thereto. For example, the detection unit 24 may further include, for example, a millimeter wave radar, or a light detection and ranging (LiDAR). The information output from the sensor of the detection unit 24 can be used to ensure, for example, that the uninhabited airborne vehicle 20 flies while autonomously bypassing obstacles in the surroundings.

The control unit 25 includes at least one processor, at least one programmable circuit, at least one dedicated circuit, or a combination thereof. The processor is, for example, a general-purpose processor such as a central processing unit (CPU) or a graphics processing unit (GPU), or a dedicated processor specialized in a specific process, but is not limited thereto. The programmable circuit is, for example, a field-programmable gate array (FPGA), but is not limited thereto. The dedicated circuit is, for example, an application specific integrated circuit (ASIC), but is not limited thereto. The control unit 25 controls the operation of the entire uninhabited airborne vehicle 20.

(Configuration of Control Apparatus)

Figure 4:
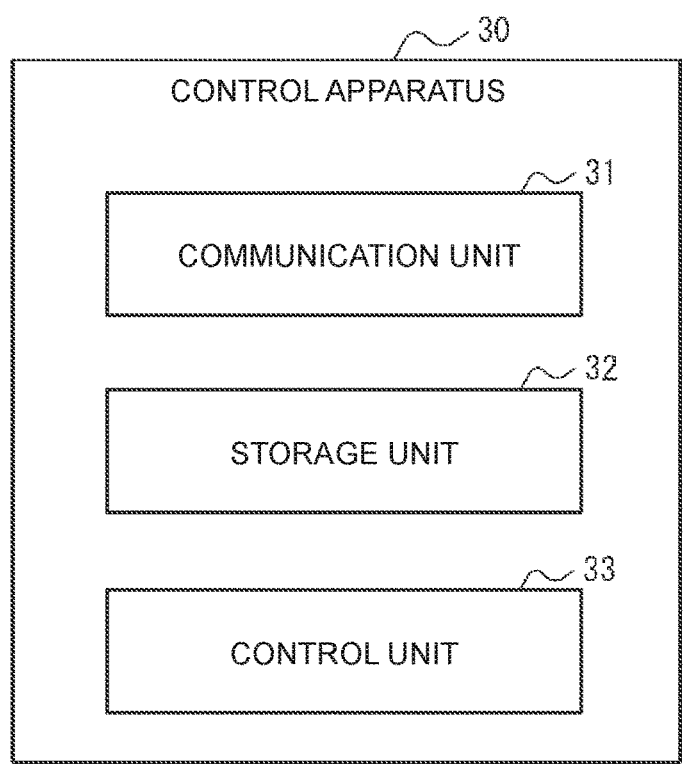
FIG. 4 is a block diagram showing the general configuration of a control apparatus.

As shown in FIG. 4, the control apparatus 30 is equipped with a communication unit 31, a storage unit 32, and a control unit 33.

The communication unit 31 includes at least one communication interface that is connected to the network 40. The communication interface corresponds to, for example, a mobile telecommunications standard, a wired local area network (LAN) standard, or a wireless LAN standard, but is not limited thereto. The communication interface may correspond to any communication standard. In the present embodiment, the control apparatus 30 communicates with the indoor devices 10 and the uninhabited airborne vehicle 20 via the communication unit 31.

The storage unit 32 includes at least one memory. Each memory included in the storage unit 32 may function as, for example, a main storage device, an auxiliary storage device, or a cash memory. The storage unit 32 stores any piece of information used to operate the control apparatus 30. For example, the storage unit 32 may store a system program, an application program, a database, map information, and the like. The information stored in the storage unit 32 may be updated with, for example, the information acquired from the network 40 via the communication unit 31.

In the present embodiment, the storage unit 32 stores information on at least one building that can be designated as a sender address from which goods are shipped or a destination address to which goods are delivered. The information on the building includes any piece of information used to determine a flight path along which the uninhabited airborne vehicle 20 moves to a destination room along an outer wall of the building. For example, the information on the building includes three-dimensional positioning data on the building, and three-dimensional coordinate data on a reference position set for the building, but is not limited thereto.

The three-dimensional positioning data on the building are three-dimensional coordinate data corresponding to the building (i.e., three-dimensional point group data). For example, a piece of information indicating which one of the outer wall of the building, the window of each of the rooms, and the balcony of each of the rooms is relevant is linked with each of the three-dimensional coordinate data. The control apparatus 30 can identify the positions of the outer wall of the building, the positions of the rooms, the positions of the windows of the rooms, and the positions of the balconies of the rooms, based on the three-dimensional positioning data on the building.

The reference position is set in advance in accordance with the building. In the present embodiment, the uninhabited airborne vehicle 20 moves to the reference position of the building along a first flight path as will be described later, and then moves from the reference position to the balcony of the destination room along the outer wall of the building along a second flight path. For example in FIG. 2, the reference position of the building 50 is a position where the uninhabited airborne vehicle 20 is depicted (on the left side of the room D in the drawing).

The control unit 33 includes at least one processor, at least one programmable circuit, at least one dedicated circuit, or a combination thereof. The control unit 33 controls the operation of the entire control apparatus 30. The details of the operation of the control apparatus 30 that is controlled by the control unit 33 will be described later in detail.

(Operation Flow of Control Apparatus)

The operation of the control apparatus 30 according to the present embodiment will be described with reference to FIG. 5.

In step S100, the control unit 33 of the control apparatus 30 acquires information indicating a building and a room as a shipment origin or a delivery destination of goods, from, for example, a terminal device of a user as a sender or a recipient of the goods, via the communication unit 31. The information includes, for example, an address of the building and a room number, but is not limited thereto.

In step S101, the control unit 33 acquires the information on the building in step S100 from the storage unit 32. As described above, the information on the building includes, for example, three-dimensional positioning data on the building, and three-dimensional coordinate data on a reference position set for the building.

In step S102, the control unit 33 moves the uninhabited airborne vehicle 20 to the reference position set for the building.

In concrete terms, the control unit 33 determines a first flight path having a current position of the uninhabited airborne vehicle 20 as a place of departure and the reference position acquired in step S101 as a destination. The control unit 33 notifies the uninhabited airborne vehicle 20 of the first flight path via the communication unit 31. The uninhabited airborne vehicle 20 moves from the current position to the reference position along the first flight path of which the uninhabited airborne vehicle 20 is notified.

In step S103, the control unit 33 acquires at least one of information on sounds in a plurality of rooms arranged along an outer wall of the building and information indicating whether windows of the rooms are open or closed, from the indoor devices 10 provided in the building, via the communication unit 31.

It should be noted herein that the information on the sounds in the rooms includes, for example, a piece of information indicating volumes of sound source devices that are the indoor devices 10 provided in the rooms, a piece of information indicating whether or not noise cancellation is carried out by the sound source devices, a piece of information indicating volumes of sounds in the rooms collected by microphones that are the indoor devices 10, a piece of information indicating whether or not speech interaction takes place in the rooms, or a combination thereof. Incidentally, the information indicating whether or not speech interaction takes place in the rooms can be obtained through, for example, any speech recognition process using the sounds in the rooms collected by the microphones.

In step S104, the control unit 33 moves the uninhabited airborne vehicle 20 from the reference position to a destination room (i.e., the room indicated by the information acquired in step S100) along the outer wall of the building, based on the information on the building acquired in step S101 and the information acquired in step S103.

In concrete terms, the control unit 33 determines the second flight path having the reference position of the building as a place of departure and the balcony of the destination room as a destination, in such a manner as to keep a certain distance from an outer wall surface of the building, based on the information on the building (i.e., the three-dimensional positioning data on the building and the three-dimensional coordinate data on the reference position).

It should be noted herein that the control unit 33 may determine the second flight path in such a manner as to avoid a specific one or specific ones of the rooms, based on the information on the sounds in the rooms acquired in step S103. Each of the specific rooms is, for example, a room where the volume of the sound source device that is the indoor device 10 is lower than a threshold, a room where noise cancellation is not carried out by the sound source device, a room where speech interaction takes place, or a combination thereof. Besides, the control unit 33 may determine the second flight path in such a manner as to avoid the room or rooms where the window or windows are open, based on the information indicating whether the windows of the rooms are open or closed as acquired in step S103.

The control unit 33 notifies the uninhabited airborne vehicle 20 of the second flight path via the communication unit 31. The uninhabited airborne vehicle 20 moves from the reference position of the building to the balcony of the destination room in such a manner as to avoid the specific one or specific ones of the rooms, along the second flight path of which the uninhabited airborne vehicle 20 is notified, and receives or gives goods.

As described above, the control apparatus 30 according to the present embodiment acquires the information on the sounds in the rooms arranged along the outer wall of the building. The control apparatus 30 moves the uninhabited airborne vehicle 20 along the outer wall of the building, based on the information on the sounds.

According to this configuration, the information on the sounds in the rooms of the building is used in moving the uninhabited airborne vehicle 20 along the outer wall of the building. Therefore, the uninhabited airborne vehicle 20 can be moved in such a manner as to avoid the room or rooms where the inhabitants are likely to feel uncomfortable with the noise of the uninhabited airborne vehicle 20, for example, the room or rooms where the volume of the sound is relatively low. Accordingly, the art of controlling the uninhabited airborne vehicle 20 is improved in that the possibility of the inhabitants of the building feeling uncomfortable with the noise of the uninhabited airborne vehicle 20 can be reduced.

While the disclosure has been described based on the various drawings and the embodiment, it should be noted that those skilled in the art may carry out various modifications and alterations based on the present disclosure. Accordingly, it should be noted that these modifications and alterations fall within the scope of the disclosure. For example, the respective components, the functions included in the respective steps, or the like can be rearranged such that there is no logical contradiction, and the components, the steps or the like can be combined into a single component, a single step or the like, or can be divided.

For example, in the foregoing embodiment, it is also possible to create an embodiment in which the configuration and operation of the control apparatus 30 are realized, in a distributed manner, by a plurality of information processing devices that can communicate with one another. Besides, it is also possible to adopt, for example, an embodiment in which the uninhabited airborne vehicle 20 is provided with at least one of the components of the control apparatus 30. Besides, although the case where the number of rooms arranged along the outer wall of the building 50 is equal to or larger than two has been described in the foregoing embodiment, there may be only one room.

Besides, in the foregoing embodiment, the control apparatus 30 moves the uninhabited airborne vehicle 20 in such a manner as to avoid the room or rooms where the volume of the sound source device that is the indoor device 10 is lower than the threshold. It should be noted herein that it is also possible to create an embodiment in which the control apparatus 30 controls the volume of at least one of the sound source devices with the volume lower than the threshold, such that the volume becomes equal to or higher than the threshold. In concrete terms, the control unit 33 of the control apparatus 30 transmits a command to increase the volume, to the sound source device via the communication unit 31. The sound source device that has received the command changes the volume of the output sound such that the volume becomes equal to or higher than the threshold. It should be noted herein that the sound source device may change the volume at a time, or may gradually change the volume until the lapse of a predetermined time.

Besides, in the foregoing embodiment, it has been described that the control apparatus 30 determines the second flight path in such a manner as to avoid the specific one or specific ones of the rooms, based on the information on the sounds in the rooms. It should be noted herein that the information on the sounds in the rooms is not limited to the concrete example described in the embodiment. For example, the information on the sound in each of the rooms may include a piece of information indicating the genre of a song played by the sound source device that is the indoor device 10 provided in the room. In this case, the control unit 33 of the control apparatus 30 determines the second flight path in such a manner as to avoid the room or rooms where songs of a predetermined genre are played, based on the information on the sounds in the rooms. The predetermined genre is a genre that tends to be relatively low in volume, for example, ambient music, but may be appropriately determined instead of being limited thereto.

Alternatively, the information on the sounds in the rooms may include a piece of information indicating whether or not the inhabitants are aware of the sounds output by the sound source devices that are the indoor devices 10 provided in the rooms respectively. The information indicating whether or not the inhabitants are aware of the sounds output by the sound source devices can be obtained through an image analysis process using the images captured by cameras that are the indoor devices 10. For example, when the inhabitants gaze at the sound source devices outputting sound, it is possible to determine that the inhabitants are aware of the sound. The control unit 33 of the control apparatus 30 determines the second flight path in such a manner as to avoid the room or rooms where the inhabitants are aware of the sounds output by the sound source devices, based on the information on the sounds in the rooms.

Besides, it is also possible to create an embodiment in which, for example, a general-purpose drone or computer is caused to function as the uninhabited airborne vehicle 20 or the control apparatus 30 according to the foregoing embodiment. In concrete terms, a program describing the processing contents realizing the respective functions of the uninhabited airborne vehicle 20 or the control apparatus 30 according to the foregoing embodiment is stored into a memory of the general-purpose drone or computer, and is read out and executed by a processor. Accordingly, the disclosure according to the present embodiment can also be realized as a program executable by a processor, or a non-transitory computer-readable medium in which the program is stored.

What is claimed is:

1. A control apparatus comprising a processor configured to:
- receive information on a building;
- move an uninhabited airborne vehicle along a first flight path to a reference position set for the building;
- acquire information on sounds in a plurality of rooms arranged along an outer wall of the building and information on whether windows of the rooms are open or closed; and
- move the uninhabited airborne vehicle from the reference position to a destination room along an outer wall of the building along a second flight path so as to keep a certain distance from the outer wall of the building, the second flight path avoiding specific rooms where a sound source device is lower than a threshold, noise cancellation is not carried out, or speech interaction takes place, and the second flight path avoiding rooms where the windows are open.

2. The control apparatus according to claim 1, wherein
- the information on the sound in the at least one room includes a piece of information indicating a volume of the sound source device provided in the room, and
- the processor moves the uninhabited airborne vehicle in such a manner as to avoid at least one room where the volume of the sound source device is lower than the threshold.

3. The control apparatus according to claim 2, wherein the processor controls the volume of the at least one sound source device with the volume lower than the threshold, such that the volume becomes equal to or higher than the threshold.

4. The control apparatus according to claim 1, wherein
- the information on the sound in the at least one room includes a piece of information indicating whether or not noise cancellation is carried out by the sound source device provided in the room, and
- the processor moves the uninhabited airborne vehicle in such a manner as to avoid at least one room where noise cancellation is not carried out.

5. The control apparatus according to claim 1, wherein
- the information on the sound in the at least one room includes a piece of information indicating whether or not speech interaction takes place in the room, and
- the processor moves the uninhabited airborne vehicle in such a manner as to avoid at least one room where speech interaction takes place.

6. The control apparatus according to claim 1, wherein the processor acquires the information on the sound in the at least one room from an indoor device provided in the room, and
- the indoor device includes at least one of a microphone and the sound source device.

7. The control apparatus according to claim 1, wherein
- the processor acquires information indicating whether a window of the at least one room is open or closed, and moves the uninhabited airborne vehicle in such a manner as to avoid at least one room where the window is open, based on the information indicating whether the window is open or closed.

8. An uninhabited airborne vehicle comprising a processor configured to:
- receive information on a building;
- move an uninhabited airborne vehicle along a first flight path to a reference position set for the building; and
- acquire information on sounds in a plurality of rooms arranged along an outer wall of the building and information on whether windows of the rooms are open or closed;
- move the uninhabited airborne vehicle from the reference position to a destination room along an outer wall of the building along a second flight path so as to keep a certain distance from the outer wall of the building, the second flight path avoiding specific rooms where a sound source device is lower than a threshold, noise cancellation is not carried out, or speech interaction takes place, and the second flight path avoiding rooms where the windows are open.

9. The uninhabited airborne vehicle according to claim 8, wherein
- the information on the sound in the at least one room includes a piece of information indicating a volume of the sound source device provided in the room, and
- the processor controls the operation of the uninhabited airborne vehicle in such a manner as to avoid at least one room where the volume of the sound source device is lower than the threshold.

10. The uninhabited airborne vehicle according to claim 9, wherein
- the processor controls the volume of the at least one sound source device with the volume lower than the threshold, such that the volume becomes equal to or higher than the threshold.

11. The uninhabited airborne vehicle according to claim 8, wherein
- the information on the sound in the at least one room includes a piece of information indicating whether or not noise cancellation is carried out by the sound source device provided in the room, and
- the processor controls the operation of the uninhabited airborne vehicle in such a manner as to avoid at least one room where noise cancellation is not carried out, when the uninhabited airborne vehicle moves along the outer wall of the building.

12. The uninhabited airborne vehicle according to claim 8, wherein
- the information on the sound in the at least one room includes a piece of information indicating whether or not speech interaction takes place in the room, and
- the processor controls the operation of the uninhabited airborne vehicle such that the uninhabited airborne vehicle moves in such a manner as to avoid at least one room where speech interaction takes place.

13. The uninhabited airborne vehicle according to claim 8, wherein
- the processor controls, based on information indicating whether a window of the at least one room is open or closed, the operation of the uninhabited airborne vehicle in such a manner as to avoid at least one room where the window is open, when the uninhabited airborne vehicle moves along the outer wall of the building.

14. A method that is carried out by a control apparatus, the method comprising:
- receiving information on a building;
- move an uninhabited airborne vehicle along a first flight path to a reference position set for the building;
- acquiring information on sounds in a plurality of rooms arranged along an outer wall of the building and information on whether windows of the rooms are open or closed; and
- moving the uninhabited airborne vehicle from the reference position to a destination room along an outer wall of the building along a second flight path so as to keep a certain distance from the outer wall of the building, the second flight path avoiding specific rooms where a sound source device is lower than a threshold, noise cancellation is not carried out, or speech interaction takes place, and the second flight path avoiding rooms where the windows are open.

15. The method according to claim 14, wherein the information on the sound in the at least one room includes a piece of information indicating a volume of the sound source device provided in the room, and the uninhabited airborne vehicle is moved in such a manner as to avoid at least one room where the volume of the sound source device is lower than a threshold.

16. The method according to claim 15, further comprising:

controlling the volume of the at least one sound source device with the volume lower than the threshold, such that the volume becomes equal to or higher than the threshold.

17. The method according to claim 14, wherein the information on the sound in the at least one room includes a piece of information indicating whether or not noise cancellation is carried out by the sound source device provided in the room, and the uninhabited airborne vehicle is moved in such a manner as to avoid at least one room where noise cancellation is not carried out.

18. The method according to claim 14, wherein the information on the sound in the at least one room includes a piece of information indicating whether or not speech interaction takes place in the room, and the uninhabited airborne vehicle is moved in such a manner as to avoid at least one room where speech interaction takes place.

19. The method according to claim 14, wherein the information on the sound in the at least one room is acquired from an indoor device provided in the room, and the indoor device includes at least one of a microphone and the sound source device.

20. The method according to claim 14, further comprising:

acquiring information indicating whether a window of the at least one room is open or closed, wherein the uninhabited airborne vehicle is moved in such a manner as to avoid at least one room where the window is open, based on the information indicating whether the window is open or closed.

* * * * *